United States Patent
Oldenettel et al.

(10) Patent No.: US 6,921,065 B2
(45) Date of Patent: Jul. 26, 2005

(54) ROLLING-LOBE AIR SPRING HAVING A SUPPORT BELL

(75) Inventors: Holger Oldenettel, Wedemark (DE); Jens-Uwe Gleu, Langenhagen (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 10/693,495

(22) Filed: Oct. 27, 2003

(65) Prior Publication Data

US 2004/0084817 A1 May 6, 2004

(30) Foreign Application Priority Data

Oct. 25, 2002 (DE) ......................................... 102 49 741

(51) Int. Cl.[7] .................................................. F16F 9/04
(52) U.S. Cl. ............................... 267/64.27; 267/64.21; 267/64.24
(58) Field of Search ........................... 267/64.11, 64.21, 267/64.23, 64.24, 64.27, 122, 35

(56) References Cited

U.S. PATENT DOCUMENTS

| | | | |
|---|---|---|---|
| 3,010,715 A | | 11/1961 | Slemmons et al. |
| 3,904,181 A | | 9/1975 | Hársy-Vadas |
| 4,712,776 A | * | 12/1987 | Geno et al. ............... 267/64.21 |
| 4,718,650 A | * | 1/1988 | Geno ........................ 267/64.27 |
| 4,852,861 A | * | 8/1989 | Harris ....................... 267/64.27 |
| 5,636,831 A | * | 6/1997 | Gubitz ...................... 267/64.24 |
| 6,637,733 B1 | * | 10/2003 | Weitzenhof et al. ..... 267/64.27 |
| 2003/0160368 A1 | | 8/2003 | Bank et al. |

FOREIGN PATENT DOCUMENTS

| | | | | |
|---|---|---|---|---|
| DE | 36 24 296 | | 2/1987 | |
| DE | 43 25 576 | | 2/1995 | |
| DE | 196 16 476 | | 11/1997 | |
| DE | 197 02 188 | | 7/1998 | |
| DE | 197 04 433 | | 8/1998 | |
| DE | 100 38 197 | | 2/2002 | |
| EP | 0 852 188 | | 7/1998 | |
| FR | 2 762 550 | | 10/1998 | |
| FR | 2 827 551 | | 1/2003 | |
| GB | 1001515 | | 8/1965 | |
| GB | 2 117 866 | | 10/1983 | |
| JP | 6-17867 A | * | 1/1994 | .............. 267/64.19 |

* cited by examiner

*Primary Examiner*—Matthew C. Graham
*Assistant Examiner*—Mariano Sy
(74) *Attorney, Agent, or Firm*—Walter Ottesen

(57) ABSTRACT

A rolling-lobe air spring (2) includes a cover (cover plate, 6-I or 6-II), a roll-off piston (8) and a rolling-lobe flexible member (4). A support bell (16-I or 16-II) is provided in order to solve stability problems. The support bell (16-I or 16-II) is rigidly connected to the cover (6-I or 6-II) in order to provide a guide of high stiffness to the rolling-lobe flexible member. The support bell (16-I or 16-II) is rigidly connected to the cover (6-I or 6-II) and can be arranged within or outside of the cover (6-I or 6-II). For an inner-lying support bell (16-I) the upper end of the rolling-lobe flexible member is attached to the throat region (18-I) of the support bell (16-I) with the aid of a clamp ring (12-I) applied from the outside. For an outside-lying support bell (16-II), the throat region (18-II) of the support bell (16-II) is deformed against the upper end of the rolling-lobe flexible member and against a support ring (12-II) disposed therebelow.

4 Claims, 3 Drawing Sheets

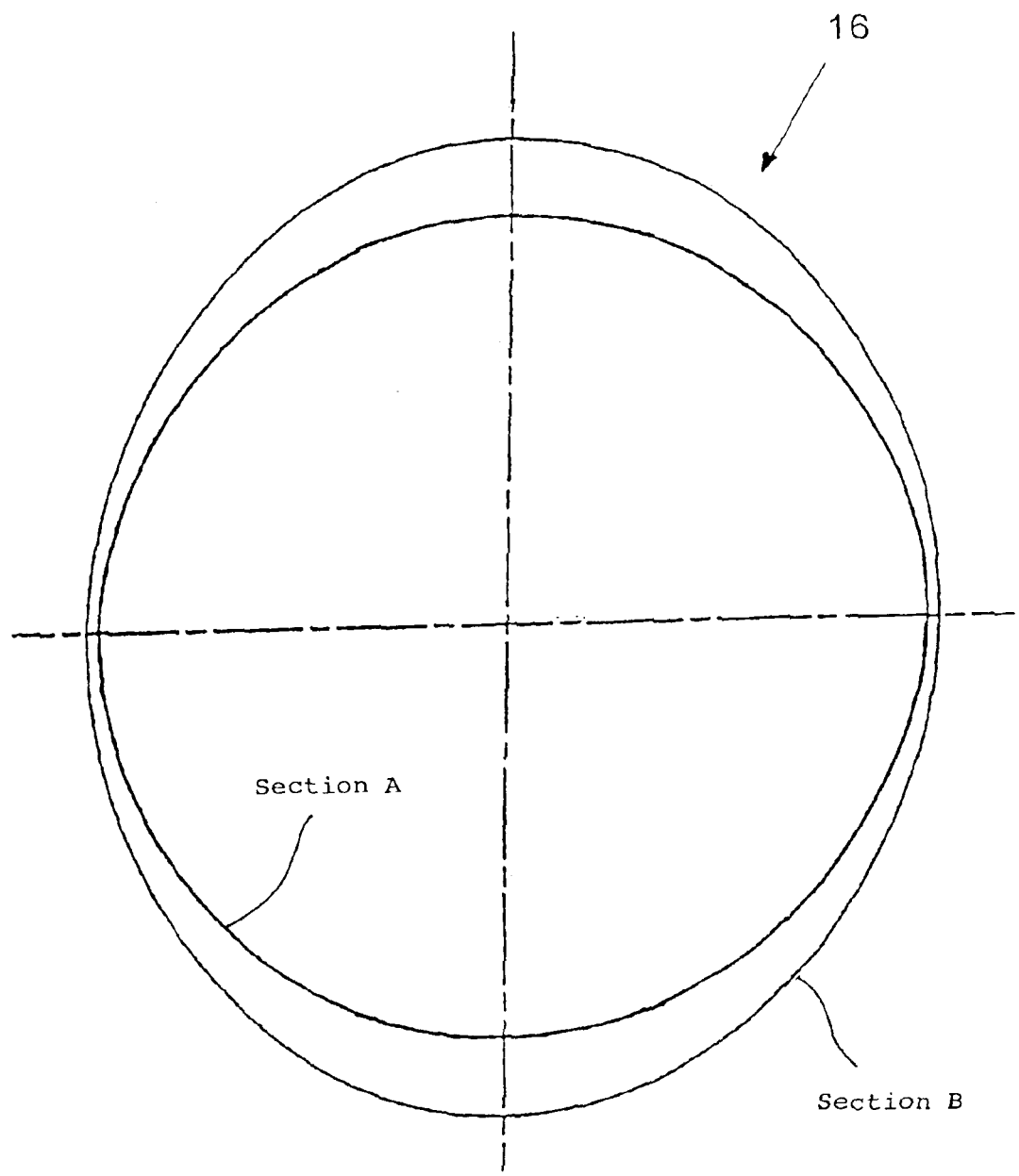

ROLLING-LOBE AIR SPRING HAVING A SUPPORT BELL

BACKGROUND OF THE INVENTION

Only low torques can be transmitted between the rolling-lobe flexible member and the cover in rolling-lobe air springs without a support bell. More specifically, the clamping of the rolling-lobe flexible member functions as a joint. Problems with respect to stability result from the soft clamping of the rolling-lobe flexible member when the air spring module as a unit is articulatedly connected to the body of a vehicle or to a connecting rod.

Air springs have been increasingly provided with support bells in order to solve the stability problem. In the air spring described in German patent publication 4,325,576, the support bell is connected indirectly to the air spring cover with the upper end of the flexible member being connected therebetween. A support bell, which is connected in this manner indirectly to the cover, provides only a slight support function because the connection of the support bell to the air spring cover is soft and flexible. Also, no reliably tight seat is ensured because of the intermediate connection of the end of the rolling-lobe flexible member. The assembly of the support bell requires several steps.

SUMMARY OF THE INVENTION

It is an object of the invention to provide a support bell for an air spring which provides high stiffness and a tight seat.

The rolling-lobe air spring of the invention includes: a cover; a roll-off piston; a rolling-lobe flexible member having a first end portion connected to the cover and a second end portion connected to the roll-off piston; and, a support bell supporting the rolling-lobe flexible member at the first end portion and being rigidly connected to the cover.

With the above, a guidance of the rolling-lobe flexible member with high stiffness is achieved. A simplification with respect to manufacture is provided with a one-piece configuration of the support bell and cover. The support function can be realized either with an inner-lying support bell or with an outer-lying support bell. With the support bell lying within the flexible member, the upper end of the flexible member is pressed against the throat region of the support bell by means of a clamp ring.

For a support bell arranged outside of the flexible member, a clamp ring is provided within the throat region of the support bell. Either the inner-lying clamp ring is expanded in advance of the assembly of the roll-off piston or the throat region of the support bell arranged on the outside is pressed against the inner-lying clamp ring. A cost savings is realized because the support bell is not a separate component. The complexity of assembly is less.

Preferably the rigid configuration of support bell and cover is mounted rotatably on the vehicle body or at the wheel end.

According to an alternate embodiment, a ball joint of this kind is disposed between the roll-off piston and the part of the vehicle assigned thereto. This part of the vehicle can be the vehicle body or a wheel connecting rod.

A degree of freedom in a preferred direction can be provided with a non-rotational symmetrical configuration of the support bell.

When the support bell is configured to be cylindrical in the region of the cover and expands elliptically toward its open end, the rolling-lobe flexible member is on one end reliably supported at the location where it is clamped but has, in the center region, so much play space that the air spring, as a whole (and without a joint connection), is not hindered in its freedom of movement for a circular-segment shaped spring deflection operation.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
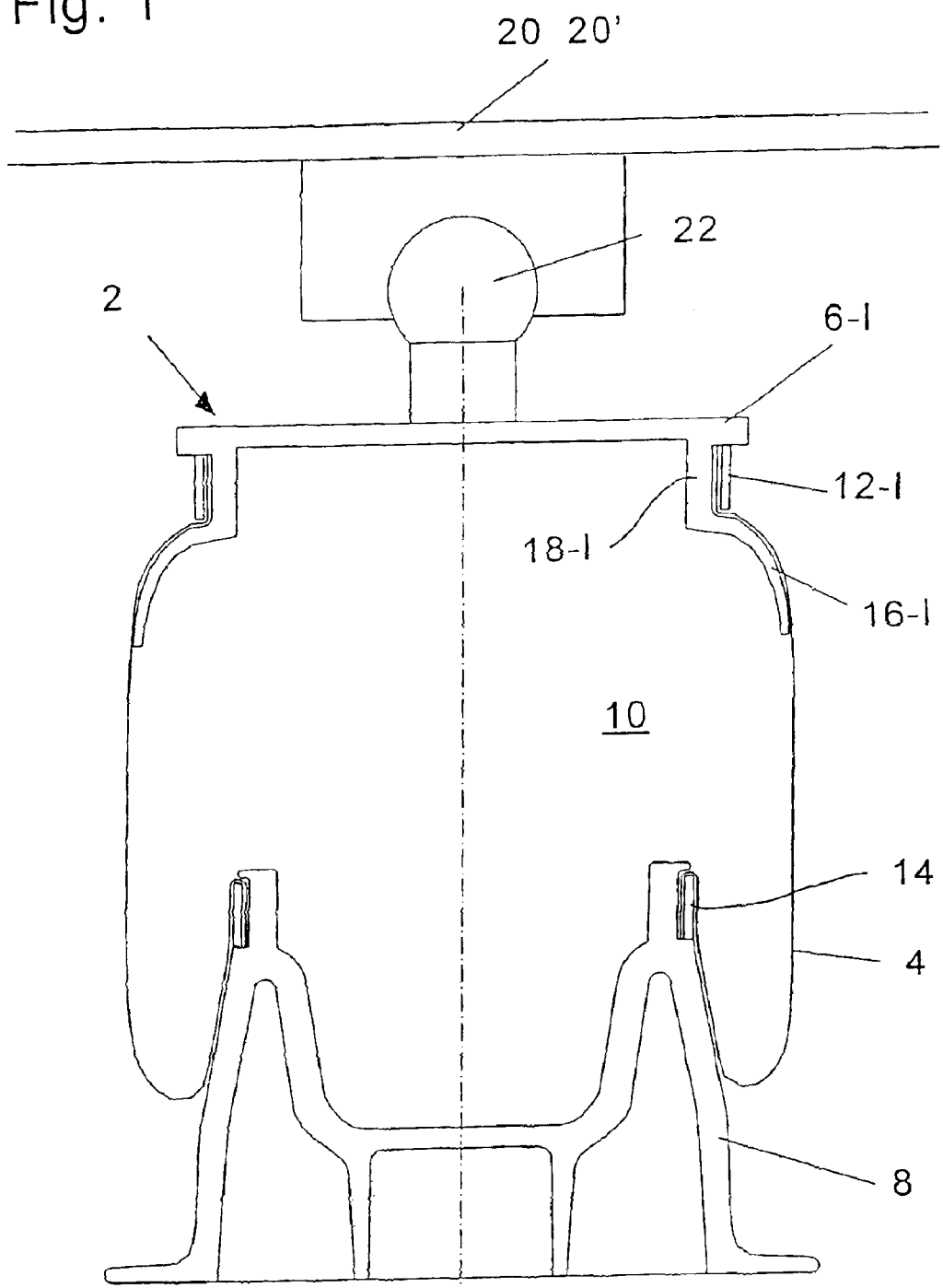
FIG. 1 is a longitudinal section view through an air spring of the invention having an inner-lying support bell.
Figure 2:
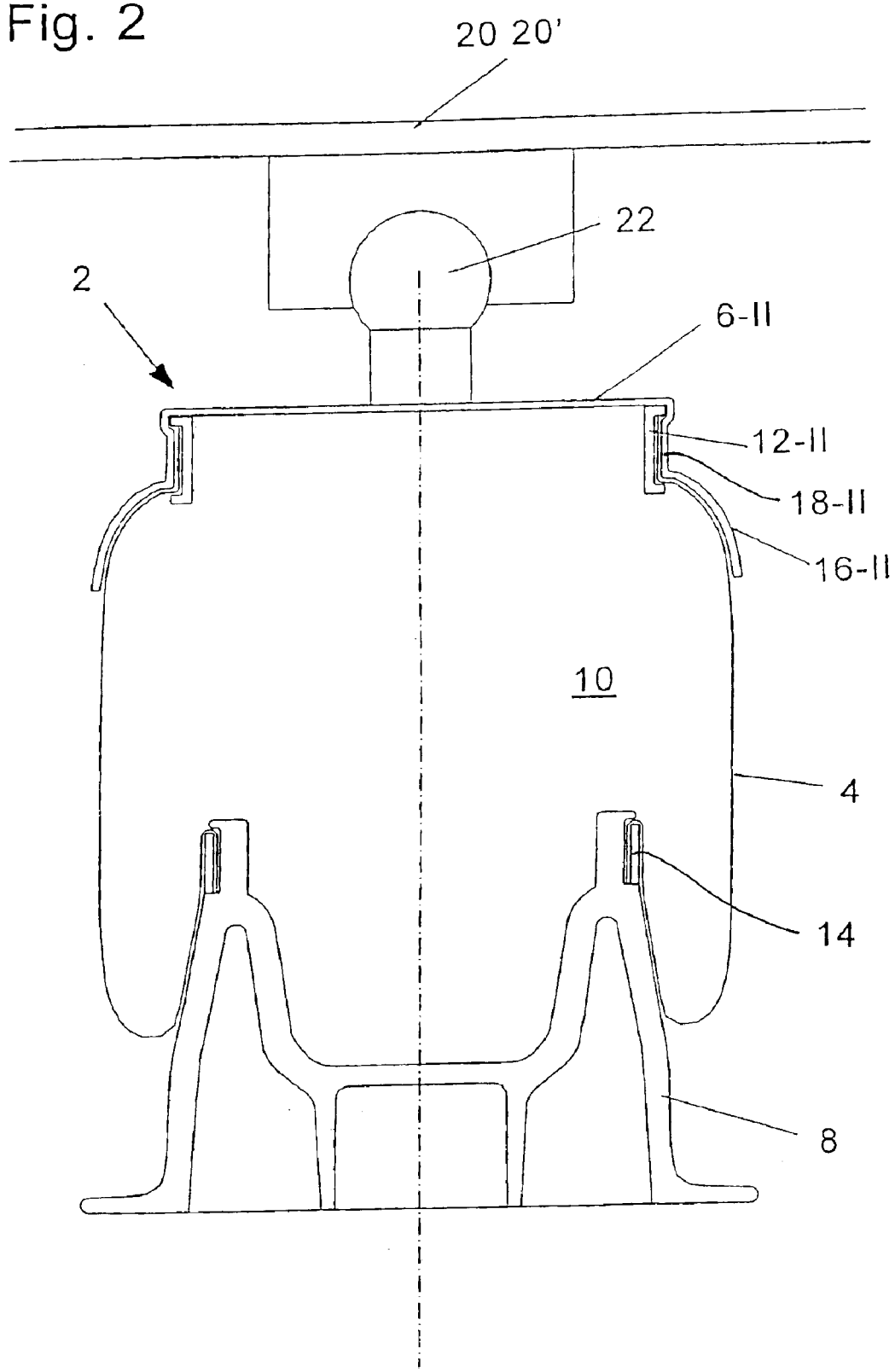
FIG. 2 is also a longitudinal section view of an air spring but with an outer-lying support bell; and, FIG. 3 shows a cross section at two different planes through a specially configured support bell.

The two embodiments of the air spring 2 according to the invention shown in FIGS. 1 and 2 each comprise a rolling-lobe flexible member 4 which is connected at its upper end to a cover (6-I or 6-II) and is connected pressure-tight at its lower end to a roll-off piston 8. The rolling-lobe flexible member encloses a pressure space 10 of variable volume. The designations "upper" and "lower" refer only to the views presented in the drawings. An opposite installation in a motor vehicle is easily possible. The end attachment of the flexible member 4 to the cover (6-I or 6-II) and the piston 8 is provided by clamp rings (12-I or 12-II) and clamp ring 14.

For lateral guidance, the rolling-lobe flexible member 4 is provided with a support bell (16-I or 16-II) in the region of the corresponding cover (6-I or 6-II).

What is special in the air spring 2 of the invention is that the covers (6-I or 6-II) and support bells (16-I or 16-II) are configured as a single piece. More specifically, the support bell (16-I or 16-II) does not define a separate component. The support bell 16-I of FIG. 1 is disposed on the inner side of the rolling-lobe flexible member 4; whereas, the support bell 16-II of FIG. 2 is arranged outside of the rolling-lobe flexible member 4.

The inner support bell 16-I, which is shown in FIG. 1, has a throat region 18-I and joins as one piece with the cover 6-I. The throat region 18-I functions for receiving and attaching the cover-end end of the rolling-lobe flexible member 4. The upper (cover-end) end of the rolling-lobe flexible member is tightly clamped by means of an upper clamp ring 12-I against the throat region 18-I of the support bell 16-I.

The outer support bell 16-II, which is shown in FIG. 2, likewise includes a throat region 18-II. Here, the cover 6-II also joins as one piece. The assigned clamp ring 12-II is disposed on the inner side of the rolling-lobe flexible member for providing a pressure-tight attachment of the upper end of the rolling-lobe flexible member. This clamping ring 12-II functions only for support; whereas, the throat region 18-II of the support bell 16-II assumes the actual clamping function in that it deforms for clamping.

The lower end of the rolling-lobe flexible member 4 is clamped pressure-tight in the conventional manner likewise by means of a clamp ring 14 at the upper end of the roll-off piston 8.

The air springs 2, which are shown in FIGS. 1 and 2, support the body of a motor vehicle. That is, the cover (6-I or 6-II) is connected to the vehicle body 20 and the piston 8 is connected at the wheel end, for example, at a connecting rod. Or the opposite can be true, namely, the cover (6-I or 6-II) is connected at the wheel end to a connecting rod 20' and the piston 8 supports the vehicle body.

In the embodiment shown in FIG. 1, a ball joint is provided between the cover 6-I and the vehicle body 20 and in FIG. 2, a ball joint is provided between the cover 6-II and the wheel connecting rod 20'.

FIG. 3 shows a non-rotational symmetrical configuration of the support bell 16. In the region of the cover, the support bell 16 is configured cylindrically (section A) so that a circularly-shaped clamp ring is used for clamping the upper end of the rolling-lobe flexible member. The support bell 16 expands elliptically toward its open end (section B) and is comparable to an oval-shaped funnel.

It is understood that the foregoing description is that of the preferred embodiments of the invention and that various changes and modifications may be made thereto without departing from the spirit and scope of the invention as defined in the appended claims.

What is claimed is:

1. A rolling-lobe air spring comprising:

a cover;

a roll-off piston;

a rolling-lobe flexible member having a first end portion connected to said cover and a second end portion connected to said roll-off piston;

a support bell supporting said rolling-lobe flexible member at said first end portion and being rigidly connected to said cover; and, said support bell having an open end facing away from said cover and toward said roll-off piston and said support bell further having a cylindrical cross section adjacent said cover and said support bell being configured to expand elliptically in cross section toward said open end thereof in the manner of an oval-shaped funnel.

2. A rolling-lobe air spring comprising:

a cover;

a roll-off piston;

a rolling-lobe flexible member having a first end portion connected to said cover and a second end portion connected to said roll-off piston;

a support bell supporting said rolling-lobe flexible member at said first end portion and being rigidly connected to said cover;

said rolling-lobe flexible member having a maximum diameter; and, said support bell being disposed outside of said rolling-lobe flexible member and extending from said first end portion over the upper region of said rolling-lobe flexible member up to approximately said maximum diameter;

said support bell having a throat region adjacent said cover; said first end portion of said rolling-lobe flexible member including an end segment at said throat region; a support ring being disposed inside of said rolling-lobe flexible member at the elevation of said throat region; and, said throat region being pressed against said end segment and said support ring to securely fasten said rolling-lobe flexible member at said first end portion thereof.

3. The rolling-lobe air spring of claim 2, wherein said cover is attached via a joint to a vehicle body and said roll-off piston is attached to a wheel connecting rod.

4. The rolling-lobe air spring of claim 2, wherein said cover is attached to a wheel connecting rod and said roll-off piston is attached via a joint to a vehicle body.

* * * * *